United States Patent
Hopp et al.

(10) Patent No.: US 8,665,482 B2
(45) Date of Patent: Mar. 4, 2014

(54) RASTER IMAGE PROCESSOR USING A SELF-TUNING BANDING MODE

(75) Inventors: Darrell Vaughn Hopp, Mission Viejo, CA (US); Kenneth David Hayber, Fountain Valley, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 1694 days.

(21) Appl. No.: 11/681,131

(22) Filed: Mar. 1, 2007

(65) Prior Publication Data

US 2008/0211819 A1    Sep. 4, 2008

(51) Int. Cl.
*G06K 15/00* (2006.01)
*G03G 15/00* (2006.01)

(52) U.S. Cl.
USPC ................... 358/1.16; 358/1.17; 345/520

(58) Field of Classification Search
None
See application file for complete search history.

(56) References Cited

U.S. PATENT DOCUMENTS

| | | | |
|---|---|---|---|
| 5,168,552 A | | 12/1992 | Vaughn et al. |
| 5,475,800 A | * | 12/1995 | Vaughn et al. ............ 358/1.9 |
| 5,604,846 A | * | 2/1997 | Kadota ....................... 358/1.16 |
| 5,913,018 A | * | 6/1999 | Sela ............................ 358/1.17 |
| 5,920,686 A | * | 7/1999 | Mitani ....................... 358/1.16 |
| 6,052,200 A | * | 4/2000 | Mitani ....................... 358/1.16 |
| 6,052,202 A | * | 4/2000 | Shimizu .................... 358/1.16 |
| 6,266,455 B1 | * | 7/2001 | Kobayashi ................ 382/307 |
| 6,266,497 B1 | | 7/2001 | Maekawa |
| 6,587,655 B2 | * | 7/2003 | Maekawa .................. 399/82 |
| 6,680,782 B1 | * | 1/2004 | Jamzadeh .................. 358/1.14 |
| 2006/0184740 A1 | * | 8/2006 | Ishikawa et al. .......... 711/129 |
| 2006/0274078 A1 | * | 12/2006 | Chung et al. .............. 345/582 |
| 2007/0248244 A1 | * | 10/2007 | Sato et al. .................. 382/103 |
| 2008/0014886 A1 | * | 1/2008 | Lee et al. ................... 455/187.1 |

FOREIGN PATENT DOCUMENTS

| | | | | |
|---|---|---|---|---|
| EP | 441497 A2 | * | 8/1991 | ............. G06F 15/72 |
| JP | H6-217119 | | 8/1994 | |
| JP | H7-195760 | | 8/1995 | |
| JP | H10-129050 | | 5/1998 | |
| JP | 11191040 | * | 7/1999 | ............. B47J 5/30 |
| JP | H11-191040 | | 7/1999 | |
| JP | 2000-168148 | | 6/2000 | |
| JP | 2002-096506 | | 4/2002 | |
| JP | 2007-030353 | | 2/2007 | |

OTHER PUBLICATIONS

Japanese Office Action, dated Jul. 5, 2011, in a counterpart Japanese patent application, No. JP 2008-043267.

* cited by examiner

*Primary Examiner* — Gabriel I Garcia
*Assistant Examiner* — Pawandeep Dhingra
(74) *Attorney, Agent, or Firm* — Chen Yoshimura LLP

(57) ABSTRACT

A raster image processor (RIP) using a self-tuning banding mode is disclosed. The RIP automatically and continuously adjusts the band size used for generating the raster image based on past performance (i.e. past data throughput values) and corresponding band sizes. At the start of each page of image, or after a certain number of pages has been processed or certain amount of time has elapsed, the RIP determines whether performance has worsened since the last band size adjustment. If it has worsened, the band size is reverted to a previous best performing value. If the performance has improved, then the band size is changed in the same direction as the last change. Raster image processing is performed using the adjusted band size.

9 Claims, 2 Drawing Sheets

RASTER IMAGE PROCESSOR USING A SELF-TUNING BANDING MODE

BACKGROUND OF THE INVENTION

1. Field of the Invention

This invention relates to raster image processors (RIP), and in particular, it relates to a raster image processor operating in a banding mode.

2. Description of Related Art

Raster image processors (RIPs) are processors that generate bitmap images from print language such as a PDL (Page Description Language). An example of a RIP is Adobe®'s Configurable Postscript Interpreter (CPSI), which generates raster imaged from PostScript® data. RIPs commonly use two modes to produce images, namely, a full-frame mode and a banding mode. In the full-frame mode, the RIP produces the image in one large block. In the banding mode, the RIP produces the image in smaller blocks referred to as bands. The RIPs typically allows the size of the bands produced to be configurable. In a conventional RIP, a constant band size is typically used for each print job.

SUMMARY

It has been found that the best data throughput is achieved when the band size is set to a value proportional to the size of the L2 cache on the CPU. In particular, the best performance is achieved when the band size is set to a value that allows one band to fit within the L2 cache. In addition to the size of the L2 cache, other significant factors affecting throughput of the RIP include application load and application behavior. With varying system conditions, it cannot be guaranteed that a fixed band size will result in a constant level of performance.

Accordingly, the present invention is directed to a raster image processor and related methods that substantially obviate one or more of the problems due to limitations and disadvantages of the related art.

An object of the present invention is to maximize the throughput of the RIP.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method implemented in a raster image processor for producing images using a banding mode, which includes: (a) setting an initial value for a band size used to produce an image; (b) automatically and continuously adjusting the band size; and (c) generating one or more images using the adjusted band size.

In another aspect, the present invention provides a computer program product that causes a data processing apparatus to perform the above method.

It is to be understood that both the foregoing general description and the following detailed description are exemplary and explanatory and are intended to provide further explanation of the invention as claimed.

DETAILED DESCRIPTION OF PREFERRED EMBODIMENTS

Embodiments of the present invention provide a method by which a raster image processor operating a banding mode automatically reconfigures its memory usage to achieve optimum throughput, i.e., to maximize the amount of data produced per unit time. To accomplish this, the RIP monitors its memory usage and its throughput and reconfigures its memory usage accordingly.

Figure 1:
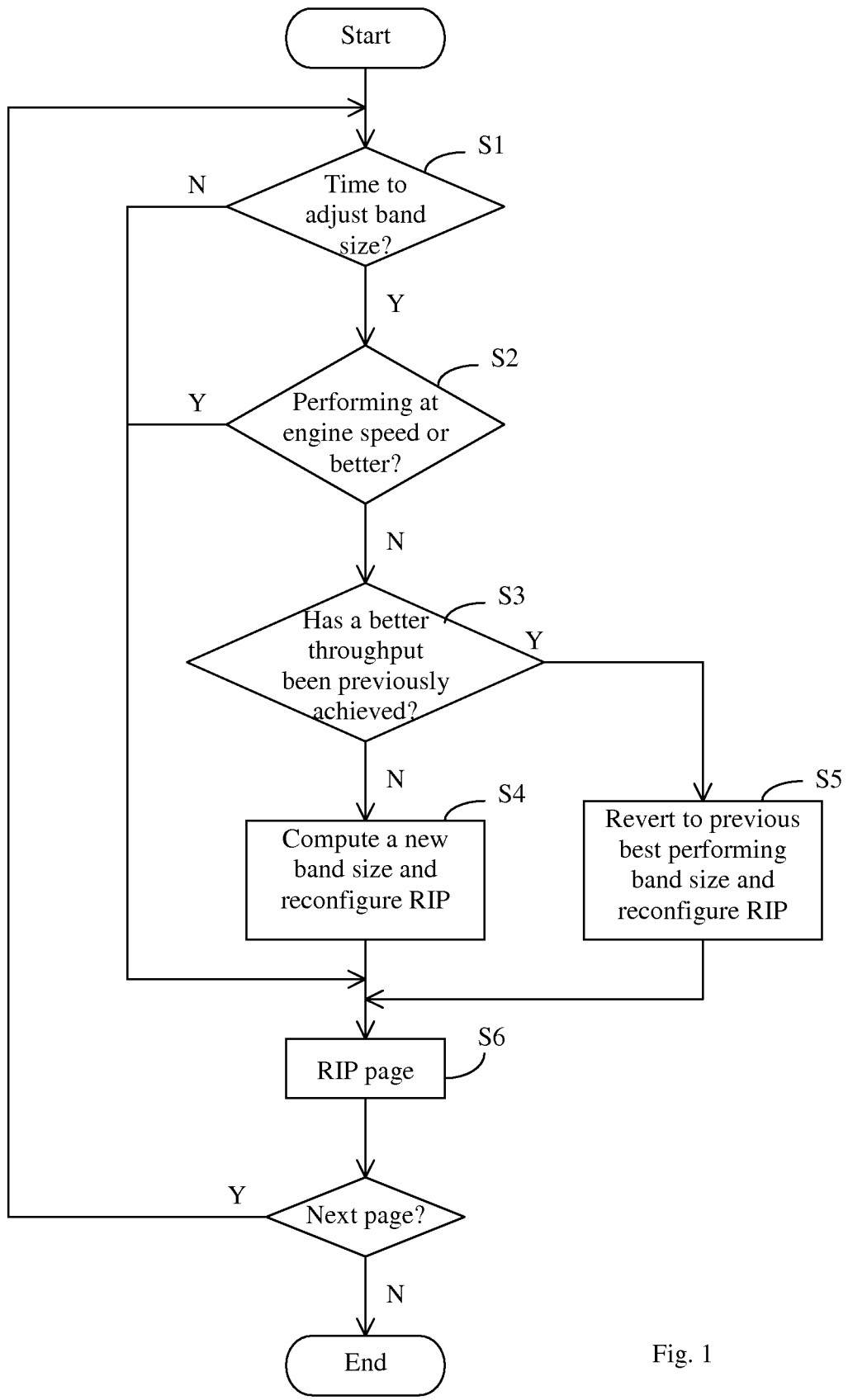
FIG. 1 is a flow chart illustrating a raster image processing method using band size adjustment according to an embodiment of the present invention.
Figure 2:
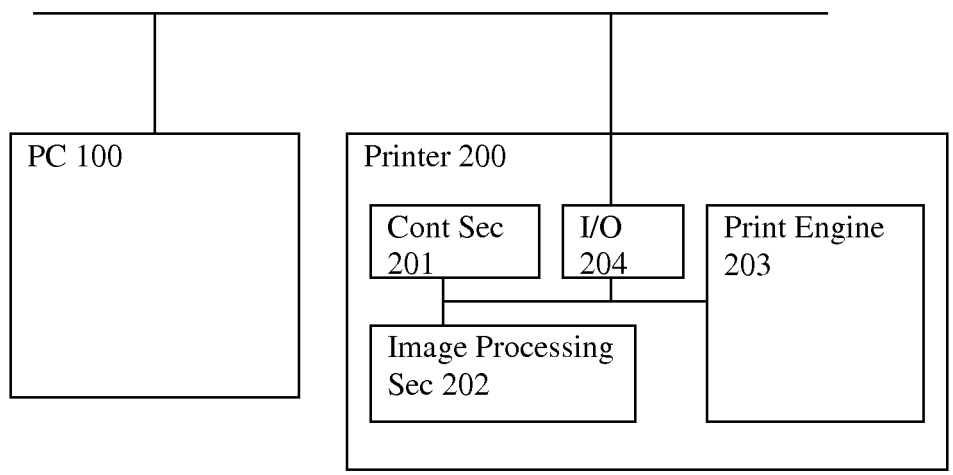
FIG. 2 is a schematic block diagram showing an exemplary printing system in which the raster image processing method according to embodiments of the present invention may be employed.

FIG. 1 illustrates a method for automatically adjusting the band size of an RIP according to embodiments of the present invention. Commonly used RIPs are designed such that at the start of the processing of each PDL page, the RIP has an opportunity to set or change the value of the band size parameter. In the method shown in FIG. 1, an initial band size value is set for the first page of the document to be processed, and at the start of each page, the RIP determines whether the band size should be adjusted and how it should be adjusted. Although not shown in FIG. 1, the RIP maintains in a memory information regarding the amount of data produced per unit time (i.e. the data throughput), both for the present time and for the past, and the values of the band size used by the RIP corresponding to the throughput values. The RIP also keeps track of whether it has been increasing or decreasing the value of the band size in the recent past. This may be accomplished, for example, by storing the historical throughput and band size values in a database. The RIP uses such information to determine if the band size parameter should be changed to achieve better performance.

In a preferred embodiment of the present invention, in order to avoid an excessive amount of changes, the band size adjustment will only occur after some interval of pages has been processed or some amount of time has elapsed since the last adjustment. Accordingly, as shown in FIG. 1, at the beginning of each PDL page, the RIP determines whether it is time to adjust the band size based on the above criteria or other suitable criteria (step S1). In a preferred embodiment, the RIP additionally uses a performance benchmark to determine whether the performance (throughput) is sufficiently satisfactory such that band size adjustment is unnecessary. For example, if the RIP is producing data at equal-to or better than the engine speed, then no adjustment is necessary (step S2). Steps S1 and S2 are optional.

If band size adjustment is desired ("N" in step S2), the RIP determines whether or not the current throughput at the current band size value is lower than a previous throughput (step S3). If performance has worsened with the current band size compared to a previous band size value ("Y" in step S3), then the band size is reverted to a previous value corresponding to the best previous throughput (step S5). If performance has increased as compared to past values ("N" in step S3), then the band size is recomputed (step S4). In the recomputing step, the band size is changed in the same direction as the last change. For example, if the last change was a decrease in band size, since performance was positively affected, the current change will also be a decrease. In a preferred embodiment, the band size is changed in step S4 by a fixed amount such as 8k, 64k, etc. Alternatively, the band size may be changed by an amount that varies with the amount of improvement in performance. In both steps S4 and S5, the RIP is reconfigured using the changed band size value. Raster image processing is then performed on the page (step S6). The portion of the RIP that performs raster image processing, i.e., generating the bitmap image, can be implemented by an existing RIP. This process (steps S1 to S6) is repeated until all pages in the PDL are processed.

As can be seen from the above description, embodiments of the present invention provides an RIP operating in a self-tuning banding mode in that during the raster image processing, the RIP continuously (including periodically and intermittently) and automatically adjusts the size of the band used to produce the image.

In the method described above, the band size adjustment is performed at the start of a page (either every page, or periodically after certain number of pages or amount of time since the last adjustment). This is convenient because many existing RIPs allow for band size adjustment at the start of a page, but the invention is not limited to such timing. More generally, the invention can be applied such that band size is adjusted at the start of a new unit of image, where a unit may be a page, multiple pages, a portion of a page, or any other suitable unit of image.

The methods described above may be implemented as a part of a raster image processor, which may be a part of a printer, a client computer, a print server, or any other suitable data processing system. It may be used to generate a raster image which may be utilized in any desired ways, such as to be printed on a printer, to be display on a display device, to be stored in a storage device, to be transferred to another device, etc.

FIG. 1 is a schematic block diagram showing an exemplary printing system. The printing system comprises a personal computer (PC) 100 and a printer 200 connected through a data communication line, such as a serial bus, a local area network (LAN), a wide area network (WAN), and so on. The PC 100 has a structure commonly known in which a document to be printed is created using an application program, and upon a user's instruction, the document is sent to the printer 200 in a form of PDL data. The printer 200 schematically comprises a control section 201, an image processing section 202, a print engine 203, and an input/output (I/O) section 204. The control section 201 comprises a central processing unit (CPU), a random access memory (RAM), and a read only memory (ROM). The CPU reads out various software programs stored in the ROM into the RAM to control the internal sections 202 through 204 of the printer 200. The CPU (and the RAM) also acts as a RIP by executing RIP program, which is also stored in ROM. The PDL data sent from the PC 100 is temporally stored in the RAM, and is rasterized by the CPU performing as the RIP on band-by-band basis as explained below in detail. The image processing section 202 carries out various image processing on rasterized image data under the control of the CPU 201, and sends the processed image data to the print engine 203. The print engine, which for instance employs the electrophotographic process, forms an image on a recording sheet based on the image data sent from the image processing section 202. The I/O section accepts print data in the form of PDL from PC 100. The raster image processing method described above is carried out by the CPU in control section 201 that acts as the RIP. That is to say, the CPU performs this method by executing the RIP program.

It will be apparent to those skilled in the art that various modification and variations can be made in the raster image processor of the present invention without departing from the spirit or scope of the invention. Thus, it is intended that the present invention cover modifications and variations that come within the scope of the appended claims and their equivalents.

What is claimed is:

1. A method implemented in a raster image processor for producing images using a banding mode, wherein the images comprise multiple image units, the method comprising:
    (a) setting an initial value for a band size used to produce an image, wherein the band size is a size of a block of image smaller than a full frame;
    (b) automatically and continuously adjusting the band size;
    (c) generating one or more images, the images being generated in a plurality of blocks, each block having the adjusted band size; and
    (d) storing past values of a data throughput of the raster image processor and corresponding past values of the band size, the data throughput being an amount of image data produced per unit time;
    wherein in step (b), the band size is adjusted based on a current data throughput value and stored past values of the data throughput and the corresponding band size, wherein step (b) comprises:
        at a start of at least some of the image units,
        (b1) determining whether the current data throughput value is lower than any past data throughput value;
        (b2) if the current data throughput value is lower than a past data throughput value, setting the band size to a value corresponding to the best past data throughput value; and
        (b3) if the current throughput is not lower than any past throughput, recomputing the band size value by adjusting it in a direction that is the same as a last band size adjustment.

2. The method of claim 1, wherein step (b) further comprises:
    at a start of each image unit, (b4) before steps (b1) to (b3), determining whether a predetermined number of units of image have been generated or a predetermined amount of time has elapsed since a last band size adjustment, wherein steps (b1) to (b3) are performed if the determination in step (b4) is affirmative.

3. The method of claim 1, wherein step (b) further comprises:
    at a start of each image unit, (b4) before steps (b1) to (b3), determining whether the current data throughput value is lower than a predetermined data throughput value, wherein steps (b1) to (b3) are performed if the determination in step (b4) is affirmative.

4. The method of claim 1, further comprising:
    printing, displaying, storing or transferring the one or more images.

5. A computer readable non-transitory medium storing a computer readable program code controlling a data processing apparatus, the computer readable program code configured to cause the data processing apparatus to execute a raster image process for producing images using a banding mode, wherein the images comprise multiple image units, the process comprising the steps of:
    (a) setting an initial value for a band size used to produce an image, wherein the band size is a size of a block of image smaller than a full frame;
    (b) automatically and continuously adjusting the band size;
    (c) generating one or more images, the images being generated in a plurality of blocks, each block having the adjusted band size;
    (d) storing past values of a data throughput of the raster image processor and corresponding past values of the band size, the data throughput being an amount of image data produced per unit time;

wherein in step (b), the band size is adjusted based on a current data throughput value and stored past values of the data throughput and the corresponding band size, wherein step (b) comprises:
  at a start of at least some of the image units:
    (b1) determining whether the current data throughput value is lower than any past data throughput value;
    (b2) if the current data throughput value is lower than a past data throughput value, setting the band size to a value corresponding to the best past data throughput value; and
    (b3) if the current throughput is not lower than any past throughput, recomputing the band size value by adjusting it in a direction that is the same as a last band size adjustment.

6. The computer readable non-transitory medium of claim 5, wherein step (b) further comprises:
  at a start of each image unit, (b4) before steps (b1) to (b3), determining whether a predetermined number of units of image have been generated or a predetermined amount of time has elapsed since a last band size adjustment, wherein steps (b1) to (b3) are performed if the determination in step (b4) is affirmative.

7. The computer readable non-transitory medium of claim 5, wherein step (b) comprises:
  at a start of each image unit, (b4) before steps (b1) to (b3), determining whether the current data throughput value is lower than a predetermined data throughput value, wherein steps (b1) to (b3) are performed if the determination in step (b4) is affirmative.

8. A method implemented in a raster image processor for producing images using a banding mode, wherein the images comprise multiple image units, the method comprising:
  (a) setting an initial value for a band size used to produce an image, wherein the band size is a size of a block of image smaller than a full frame;
  (b) automatically and continuously adjusting the band size;
  (c) generating one or more images, the images being generated in a plurality of blocks, each block having the adjusted band size; and
  (d) measuring data throughput of the raster image processor during image generation, the data throughput being an amount of image data produced per unit time;
  wherein in step (b), the band size is adjusted based on a current data throughput value and the measured data throughput, wherein step (b) comprises:
    at a start of at least some of the image units,
    (b1) determining whether the current data throughput value is lower than any measured data throughput value;
    (b2) if the current data throughput value is lower than a measured data throughput value, setting the band size to a value corresponding to the best measured data throughput value; and
    (b3) if the current throughput is not lower than any measured throughput, recomputing the band size value by adjusting it in a direction that is the same as a last band size adjustment.

9. A computer readable non-transitory medium storing a computer readable program code controlling a data processing apparatus, the computer readable program code configured to cause the data processing apparatus to execute a raster image process for producing images using a banding mode, wherein the images comprise multiple image units, the process comprising the steps of:
  (a) setting an initial value for a band size used to produce an image, wherein the band size is a size of a block of image smaller than a full frame;
  (b) automatically and continuously adjusting the band size;
  (c) generating one or more images, the images being generated in a plurality of blocks, each block having the adjusted band size; and
  (d) measuring data throughput of the raster image processor during image generation, the data throughput being an amount of image data produced per unit time;
  wherein in step (b), the band size is adjusted based on a current data throughput value and the measured data throughput, wherein step (b) comprises:
    at a start of at least some of the image units,
    (b1) determining whether the current data throughput value is lower than any measured data throughput value;
    (b2) if the current data throughput value is lower than a measured data throughput value, setting the band size to a value corresponding to the best measured data throughput value; and
    (b3) if the current throughput is not lower than any measured throughput, recomputing the band size value by adjusting it in a direction that is the same as a last band size adjustment.

* * * * *